(12) United States Patent
Komatsu et al.

(10) Patent No.: US 6,249,969 B1
(45) Date of Patent: Jun. 26, 2001

(54) AUTOMATIC ASSEMBLING METHOD AND APPARATUS FOR DIFFERENTIAL GEAR

(75) Inventors: Katsunari Komatsu; Hidetoshi Abe; Toshihito Tsuchida; Masaru Shibata, all of Shizuoka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/141,605

(22) Filed: Aug. 28, 1998

(51) Int. Cl.⁷ .............................. B21D 53/28; B23P 19/00
(52) U.S. Cl. .............................. 29/893.1; 29/791; 29/821; 29/DIG. 46
(58) Field of Search .................................. 29/893.1, 791, 29/821, DIG. 46

(56) References Cited

U.S. PATENT DOCUMENTS 5,400,506 * 3/1995 Ichiki et al. .............................. 29/791

FOREIGN PATENT DOCUMENTS 6156338A 6/1994 (JP).

* cited by examiner

Primary Examiner—P. W. Echols

(57) ABSTRACT

An automatic assembling method and apparatus for a differential gear, for simplifying the structure of the apparatus and achieving positive assembling without damage to gear teeth of gears, wherein while positioning a pair of side gears R, R at predetermined positions in a differential case C, a pinion gear P and a spherical washer Q are fitted to coincide with each other at shaft insertion bores thereof so as to be inserted with an internal chuck 14 from inside of the pinion gear P (i.e., center side of the differential case), thereby the pinion gear P and the spherical washer Q are held together at respective internal surfaces. Thereafter, the pinion gear P is meshed with the side gear R at gear teeth portions thereof at an opening H of the differential case C, and the pinion gear P is moved to an assembling position while holding the side gear rotatable. A shaft S is then inserted from a shaft hole e of the differential case C, thereby assembling the differential gear.

8 Claims, 9 Drawing Sheets

(A)

(B)

AUTOMATIC ASSEMBLING METHOD AND APPARATUS FOR DIFFERENTIAL GEAR

BACKGROUND OF THE INVENTION

1. Field of the Invention

The present invention relates to an automatic assembling method and apparatus for a differential gear which comprises a differential arrangement or mechanism of an automobile, for instance.

2. Description of the Prior Art

Conventionally, a differential gear that makes up the differential gear arrangement or mechanism of an automobile has been assembled manually by worker(s), or by a known assembling method, for instance, as shown in Japanese Patent Laying-Open No. Hei 6-156338 (1994).

In the manual assembly method performed manually by worker(s), a pair of side gears are positioned along a predetermined one of three orthogonal axial directions within a differential case, and a pair of spherical washers and a pair of pinion gears are inserted from a pair of openings formed in the differential case in another axial direction so as to mesh with the gear teeth of the side gears and the pinion gears. Thereafter, while rotating the side gears and moving the pinion gear and the spherical washer to a position shifted by 90 degrees in phase, central axes of the pinion gear and the spherical washer are fitted in the remaining one axial direction. Then, at this position, by inserting a shaft from a shaft hole directly to a shaft insertion bore at central shaft portions of each of the pinion gears and the spherical washers like a spear, the differential gear is thereby assembled.

On the other hand, in the case of Japanese Patent Laying-Open No. Hei 6-156338 (1994) mentioned above, the pair of side gears are positioned rotatably in the differential case, and edge portions of a pair of pinion support devices are inserted into the shaft insertion bores of the spherical washers and the pinion gears from the spherical washer side so as to hold them at each internal round surface thereof. At the same time, the gear teeth of the side gears and the pinion gears are meshed with each other, and then the edge portions of the pinion support devices are pulled out from the pinion gears. Thereafter, by means of a pinion pushing device, the pinion gear and the spherical washer are urged to a position shifted by 90 degrees in phase, and then the shaft is inserted therein to by aligning the shaft insertion bores formed in the central axial portions of the pinion gear and the spherical washer to the shaft hole of the differential case.

However, with the prior art, in particular the manual assembling method, there are drawbacks in that workers who are skilled in such tasks are necessitated and that it needs a large number of assembling processes.

In addition, in the case of Japanese Patent Laying-Open No. Hei 6-156338 (1994) mentioned above, the pinion gear and the spherical washer are supported by each of the pinion gear support devices from the spherical washer side (or differential case side). Therefore, it is necessary to open or relieve the holding by the pinion support devices so as to avoid interference between the pinion support devices and the differential case when moving the pinion gears and so on to the position shifted by 90 degrees in phase after meshing with the gear teeth of the pinion gears and the side gears. Therefore, it is impossible to move the pinion gears and so on to the predetermined positions without the provision of separate pinion pushing devices. Therefore, there is a drawback that the manufacturing equipment becomes complex and oversize.

Further, since pressure is applied at the gear teeth of the pinion gear, and further since the pinion gear meshes with the side gear thereby accompanying the rotation thereof when it is moved, there is therefore also a drawback in that the gear teeth of the pinion gear are easily damaged or broken.

Moreover, there may also be a drawback in that it is impossible to insert the shaft without holding the spherical washer at the proper position simultaneously while pushing the pinion gear, since the shaft insertion bores of the pinion gear and the spherical washer become misaligned when it is moved to the predetermined position.

SUMMARY OF THE INVENTION

For resolving the drawbacks in the above-mentioned conventional art, an object of the present invention is, therefore, to provide an automatic assembling method and an automatic assembling apparatus for assembling the differential gear automatically and certainly without causing any damage to the pinion gears and so on thereof, while reducing the necessary numbers of workers and manufacturing steps.

For achieving the above-mentioned object, in accordance with the present invention there is provided an automatic assembling method for a differential gear, comprising the steps of: positioning a pair of side gears opposing to each other, within a differential case along a predetermined one of three orthogonal axial directions with respect to a central portion of the differential case; inserting a pair of pinion gears and a pair of spherical washers into the differential case from a pair of openings formed in the differential case in another axial direction which is orthogonal to the predetermined one of the axial directions; aligning the pair of pinion gears and the pair of spherical washers at respective central axes thereof in the remaining one of said three orthogonal axial directions; and thereafter, inserting a shaft directly into shaft insertion bores formed at central axial portions of the pinion gears and the spherical washers from a shaft hole of said differential case; inserting an internal chuck directly into each shaft insertion bore from an inner side of the pinion gear (i.e., from the center side of the differential case) after aligning the spherical washer outside of said pinion gear (i.e., at the side of the differential case), so as to hold the pinion gear and the spherical washer as a unit; meshing gear teeth of the pinion gear and the side gear with each other in a vicinity of the opening of said differential case; and, allowing the side gear to rotate and moving the internal chuck into a predetermined direction, thereby positioning the central axes of the pinion gear and the spherical washer into a predetermined axial direction.

In this manner, by inserting the internal chuck directly into each shaft insertion bore from the inner side of the pinion gear (i.e., center side of the differential case) after aligning the spherical washer at the outside of said pinion gear (i.e., at the side of the differential case) thereby causing the shaft insertion bores to coincide with each other so as to hold the pinion gear and the spherical washer as a unit, when moving the pinion gear and so on to the assembling position which is different by 90 degrees in phase after meshing the pinion gear with the side gear, the internal chuck will not interfere with the case, thereby enabling the pinion gear and so on to be maintained in proper position.

Therefore, it is possible to set the pinion gear and the spherical washer at the assembling positions thereof while precisely maintaining the relative positions between them, and further it is possible to avoid causing any damage to the pinion gears since no pressure is applied when moving the pinion gears.

Further as set forth in the present invention, there is provided an automatic assembling method, wherein after aligning the central axes of said pinion gear and said spherical washer into the predetermined axial direction, which further comprises the steps of: pulling the internal chuck out at one side and inserting said shaft or a provisional shaft into the shaft insertion bores of the pinion gear and the spherical washer at said one side, thereby fixing them to the differential case; and following the above, pulling the internal chuck out at another side and inserting the provisional shaft or said shaft into the shaft insertion bores of the pinion gear and the spherical washer at said other side, thereby fixing them to the differential case; and advancing said shafts towards the shaft insertion bores into which the provisional shafts are inserted at a time when both of the internal chucks are removed from the differential case, so as to insert the shaft in place of the provisional shaft, thereby causing the shafts to penetrate positively like a spear.

Namely, because the pair of pinion gears and so on are assembled in such a condition that they are opposite to each other in a direction orthogonal to the central axis of the side gear, if the internal chucks are pulled out at the same time after setting the pinion gears and so on at the assembling positions, it is impossible to pull them out since they interfere with each other in the vicinity of the central portion of the case.

Further, if both the internal chucks are not pulled out, the shaft cannot be properly inserted.

Then, the internal chucks are pulled out one by one, i.e., when pulling out the internal chuck at one side, and at the same time, the shaft or the provisional shaft is moved forward into the shaft insertion bores, so as to provisionally fix them. Then, the provisional shaft or the shaft is inserted while pulling out the internal chuck at the other side at the same time. Both the internal chucks are removed from the case, and then the shaft is penetrated through in place of the provisional shaft.

At this time, with positions and the order of insertion of the shaft and the provisional shaft, they can be positioned at either side thereof and in any other order thereof.

Further, according to the present invention there is provided an automatic assembling apparatus for a differential gear, in which a pair of side gears, a pair of pinion gears and a pair of spherical washers are inserted into a differential case and are assembled by a shaft, comprising: a case supporting unit for positioning said case at a predetermined position thereof; a side-gear clamp unit for positioning said pair of side gears at predetermined positions within the case; a pair of chuck units, each of which can hold said pinion gear and said spherical washer simultaneously and move them to predetermined positions thereof; and, a shaft insertion unit for assembling the pinion gears and the spherical washers by inserting the shaft into the shaft insertion bores formed at central axial portions thereof from a shaft hole of said case, penetrating them like a spear, wherein each of said chuck units comprises an internal chuck attached at a tip of an arm, each insertable into the shaft insertion bores of said pinion gear and said spherical washer to hold them at internal surfaces of the bores thereof, and further each of said internal chucks is attached to said arms by being bent in an "L" shape.

The pair of side gears are inserted into the differential case which is supported by the case supporting unit, and the side gears are positioned by the side-gear clamp units. At the same time, into the case are inserted the pinion gears and the spherical washers held by the internal chucks and moved to the predetermined assembling positions thereof. After aligning the respective shaft insertion bores of the pinion gear and the spherical washer with the shaft hole of the case, then the shaft is inserted in the direction of the shaft insertion bores from the shaft insertion hole of the case, by means of the shaft insertion unit, like a spear, thereby assembling them.

At this time, since the internal chuck is attached at the tip of the arm, bent In the shape of an "L", it is possible to insert the internal chuck into the shaft insertion bores of the pinion gear and the spherical washer to hold them, from the inside of the pinion gear (i.e., at the center portion of the differential case) under the condition that the tip of the arm is inserted therein to from the opening of the case.

Therefore, after holding the pinion gear and the spherical washer by the internal chuck, it is possible to move the pinion gear and so on to the assembling position being shifted by about 90 degrees, by inserting the tip of the arm into the case from the opening so as to mesh the gear teeth portions of the pinion gear together with the side gear, and then shaking the base portion of the arm.

Further, in accordance with the present invention said side-gear clamp unit is so constructed that it can support the side gear either rotatably or unrotatably, depending on an adjustment in a clamping force thereof.

In this manner, since the side gear can be held in either a rotatable or an unrotatable manner, it is therefore possible to achieve a treatment or operation such that, for example, when the gear teeth portions of the pinion gear and the side gear are meshed with each other by aligning the phases thereof in advance, firstly the side gear is held unrotatable, and then it Is held rotatable when the pinion gear is moved, thereby obtaining a smooth operation.

Further, in accordance with the present invention the internal chuck of the chuck unit is shaken or vibrated through a shaking mechanism provided at a base portion of said arm.

With a shaking internal chuck, it is possible to absorb an unreasonable force being applied to the gear teeth portions of, for example, the pinion gear and the side gear, even if they become misaligned a little bit when they are meshed with each other.

The shaking mechanism can be constructed with the arm and an arm supporting portion for supporting the arm, being connected with a plurality of springs. In the alternative, it can be constructed with the arm and an arm supporting portion for supporting the arm, being connected with a coupling having elasticity.

Namely, with use of the elasticity of the spring and the coupling, the internal chuck at the tip of the arm is able to vibrate or shake.

Further, according to the present invention the shaft insertion unit further comprises a provisional shaft insertion mechanism for temporarily positioning the pinion gear and the spherical washer at either side by inserting a provisional shaft into the shaft insertion bores thereof. Finally the pair of pinion gears are fixed by a shaft by the shaft insertion mechanism for inserting the shaft like a spear.

With provision of this provisional shaft insertion mechanism, it is possible to apply the assembling method in accordance with the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 2(A) shows the Y-Z plane.

DETAILED DESCRIPTION OF PREFERRED EMBODIMENTS

Hereinafter, embodiments of the present invention will be fully explained by referring to the attached drawings.

Figure 1:
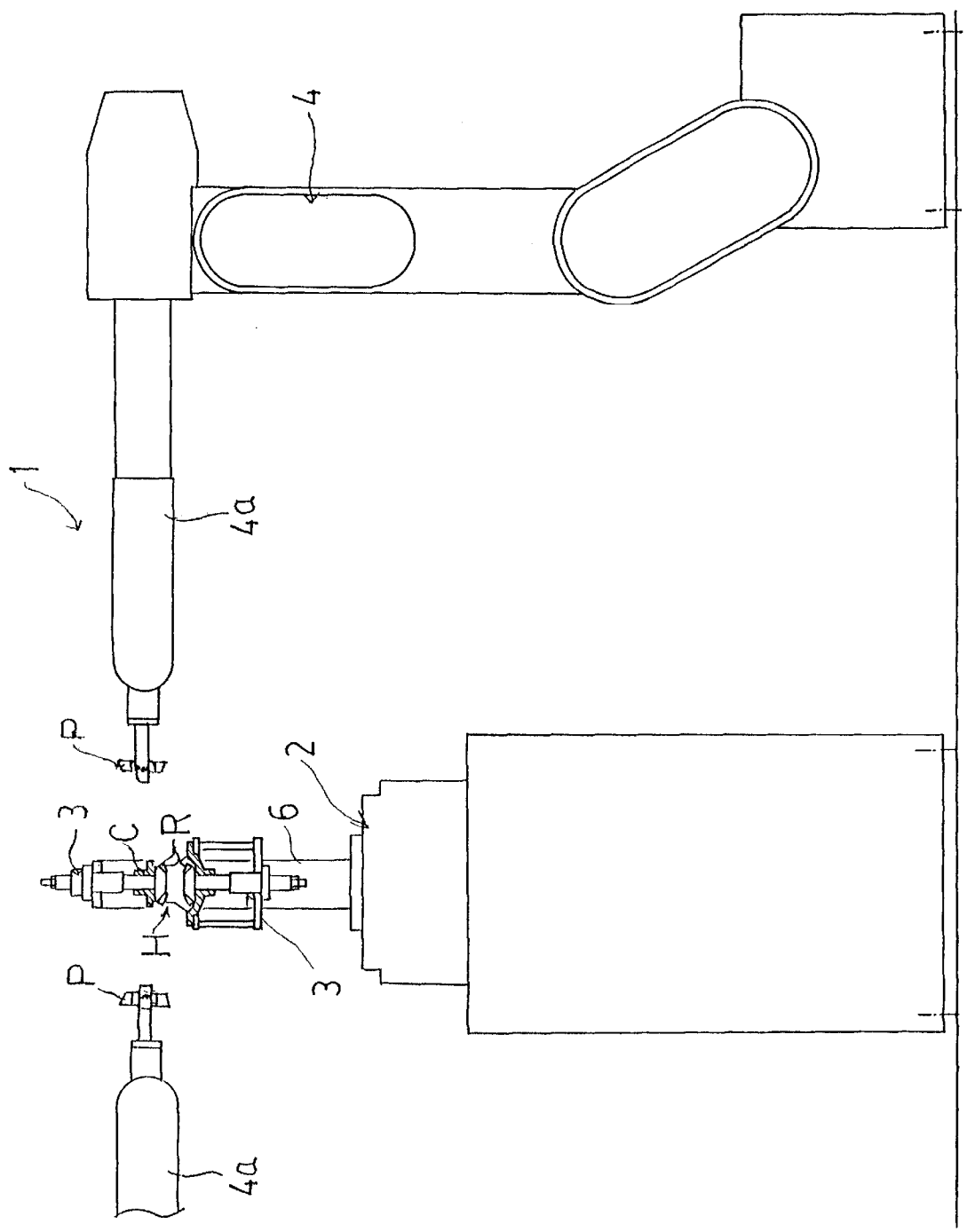
FIG. 1 shows the entire structure of an automatic assembling apparatus according to the present invention.
Figure 2:
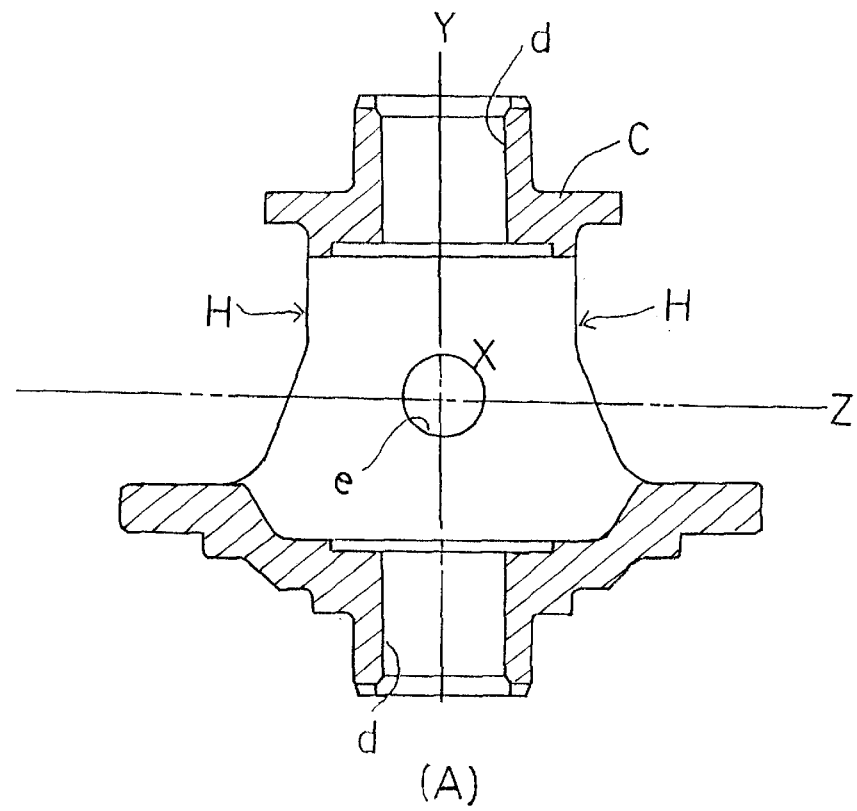
FIGS. 2(A) and (B) show vertical cross section views of a differential case in two orthogonal planes, i.e.
FIG. 2(B) shows the Y-X plane.
Figure 2:
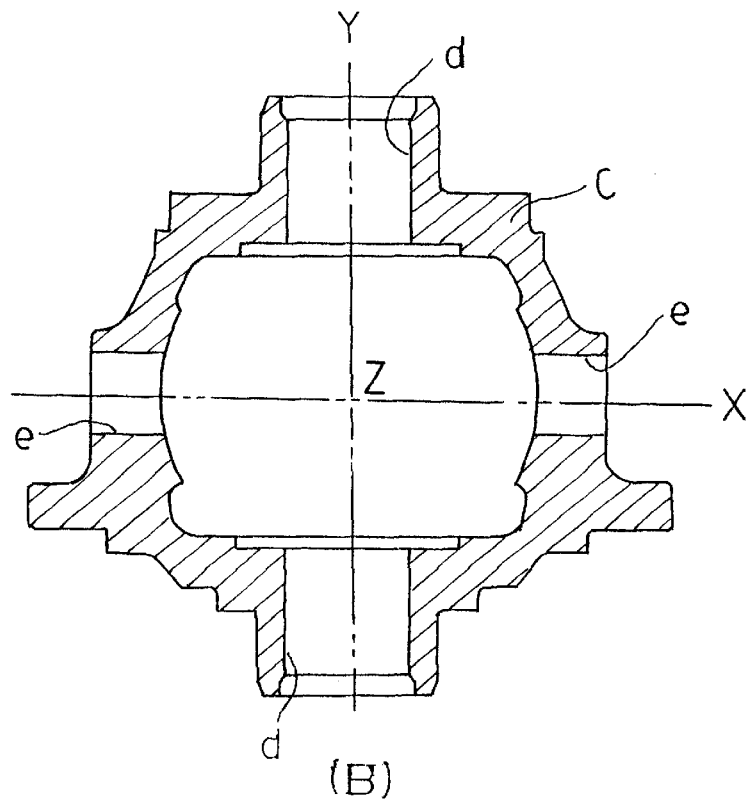
Figure 3:
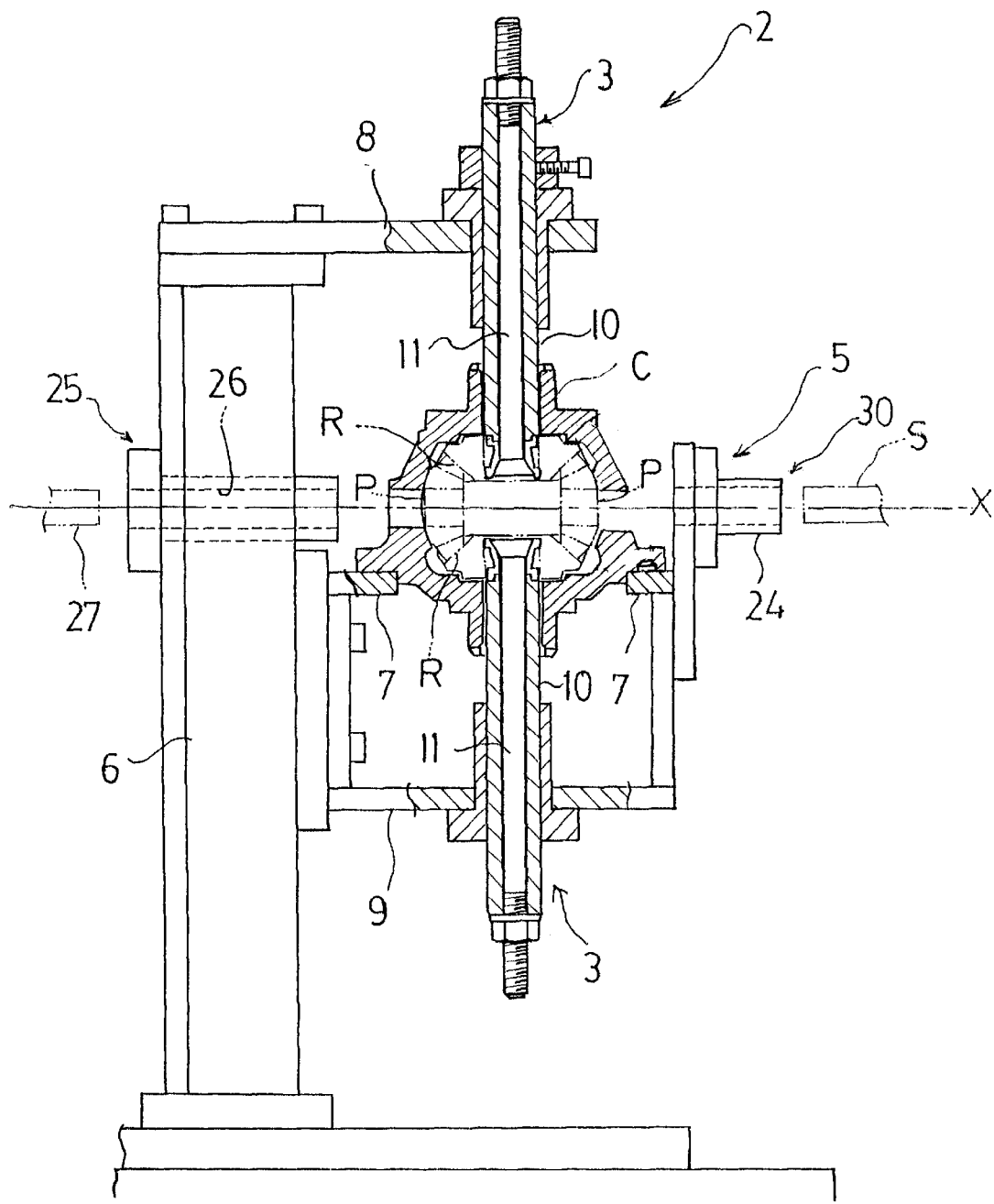
FIG. 3 shows a cross section view for explanation of a case supporting unit and a shaft insertion unit.
Figure 4:
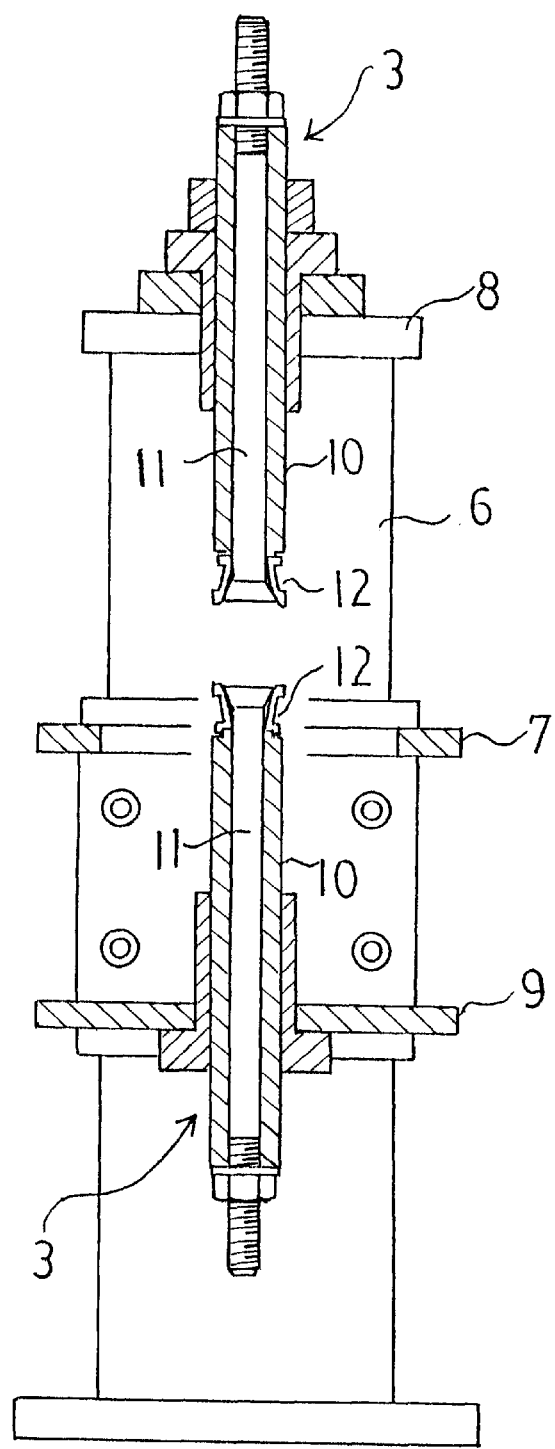
FIG. 4 shows a cross section view for explanation of a side-gear clamp unit.
Figure 5:
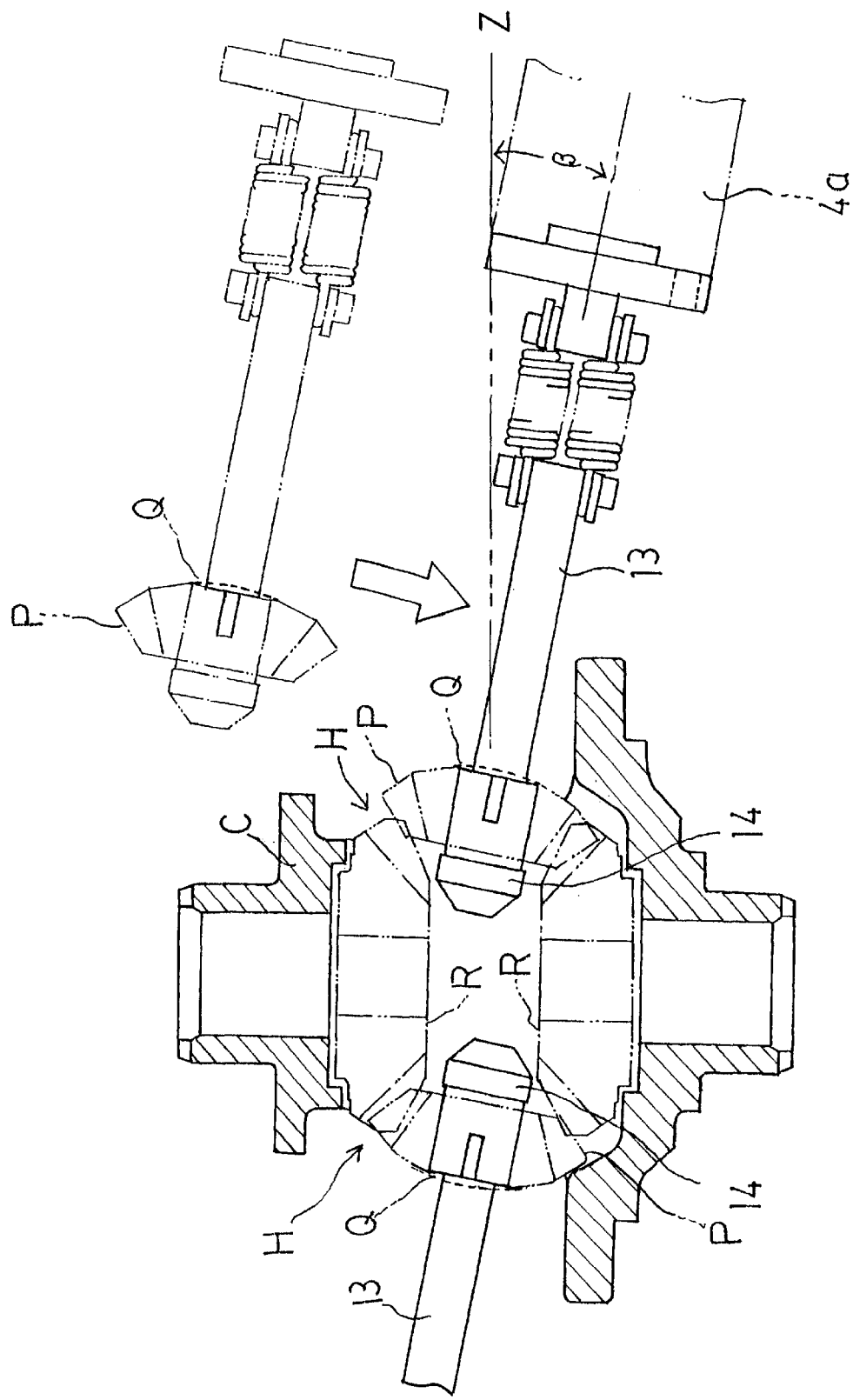
FIG. 5 shows a side view for showing operation when trying to mesh a pinion gear held by an internal chuck with a side gear.
Figure 6:
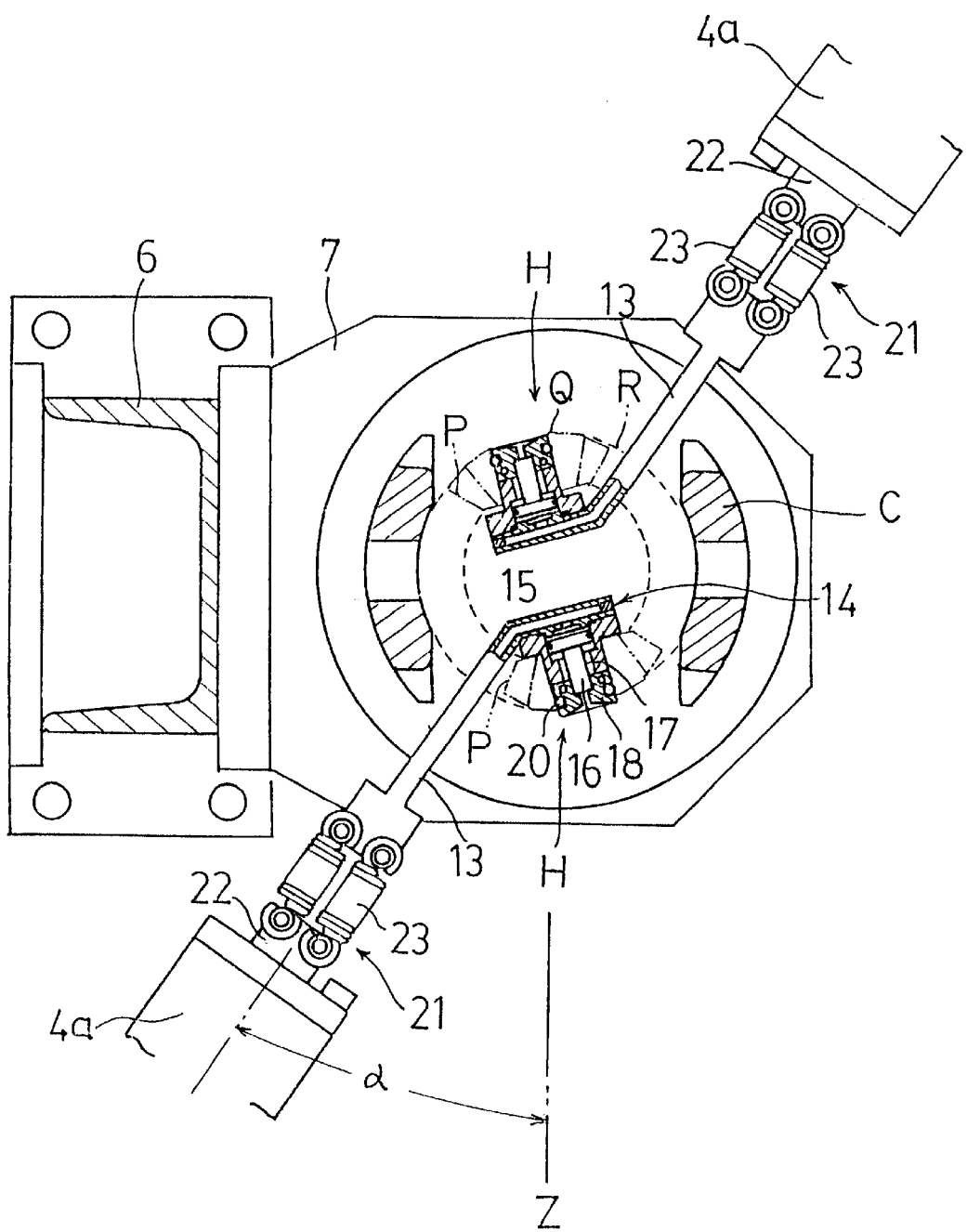
FIG. 6 shows a plane view for showing a condition where the pinion gear held by an internal chuck is meshed with the side gear.
Figure 7:
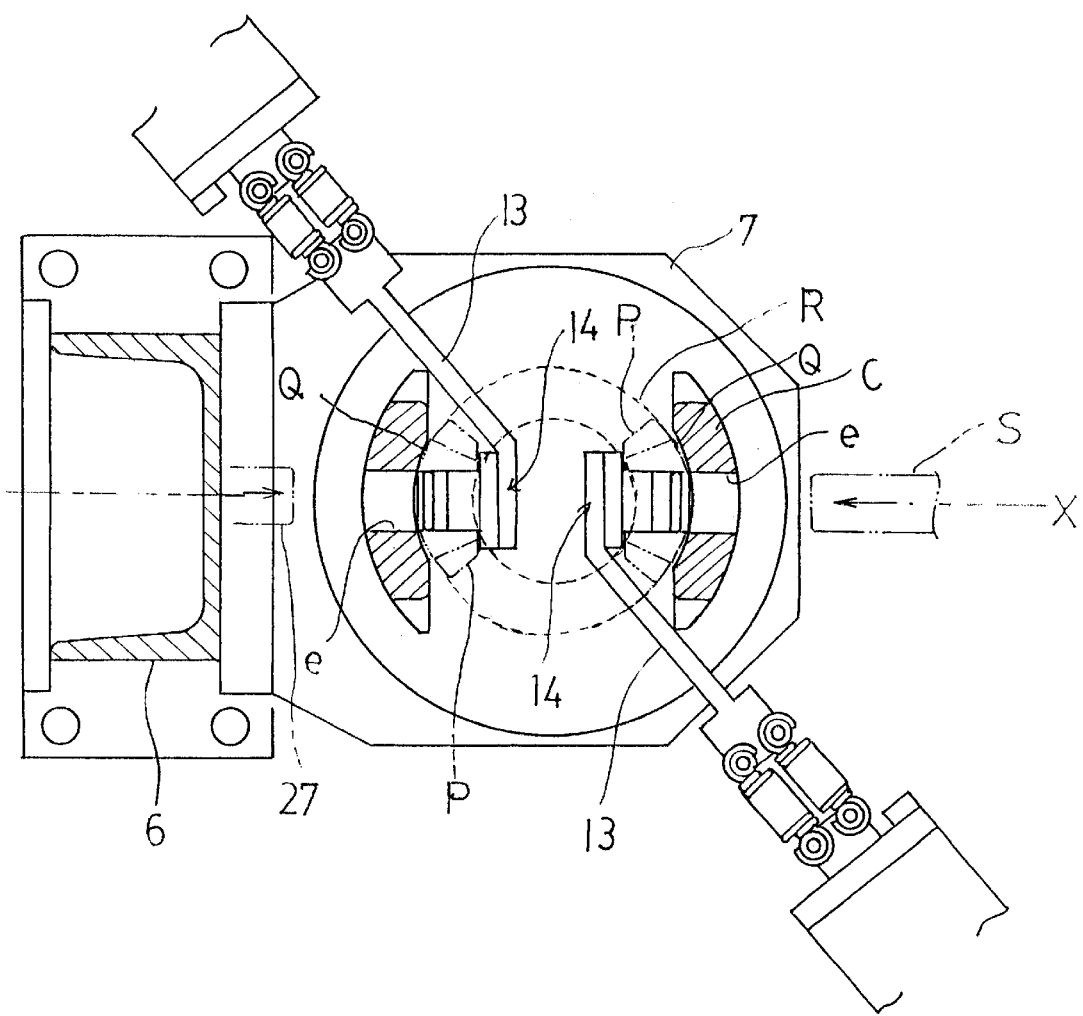
FIG. 7 shows a plane view for showing a condition where the pinion gear and so on which are held by an internal chuck and are moved to a predetermined assembling position.
Figure 8:
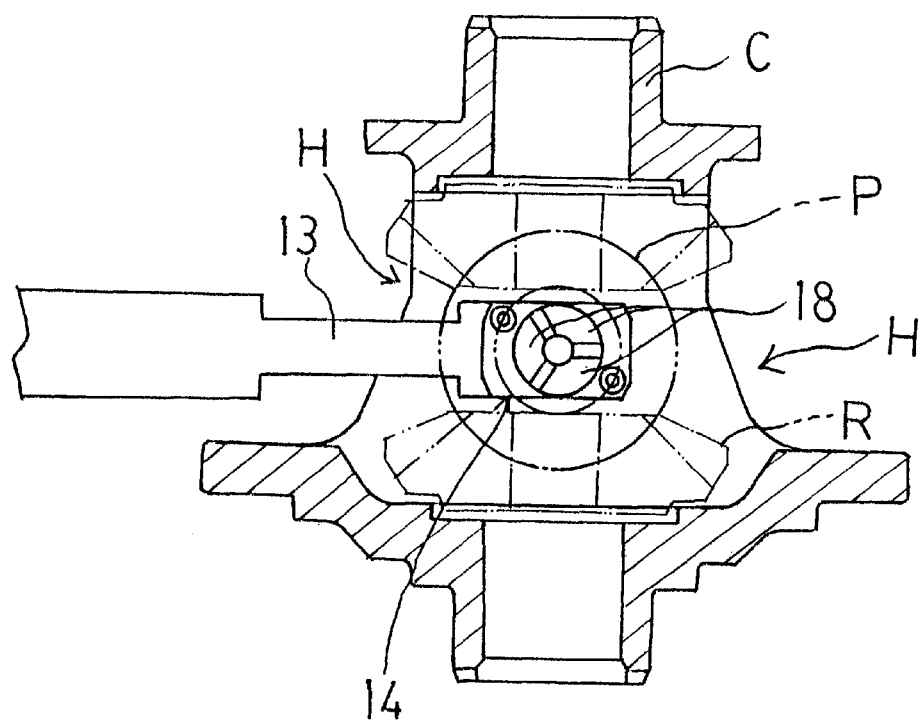
FIG. 8 shows a front view of the internal chuck.

Here, FIG. 1 shows the entire structure of an automatic assembling apparatus according to the present invention; FIGS. 2(A) and (B) show vertical cross section views of a differential case in two orthogonal planes, i.e., FIG. 2(A) shows the Y-Z plane, and FIG. 2(B) shows the Y-X plane; FIG. 3 shows a cross section view for explanation of a case supporting unit and a shaft insertion unit; FIG. 4 shows a cross section view for explanation of a side-gear clamp unit; FIGS. 5 through 7 are various views for explanation of an assembling method with use of internal chucks; and FIG. 8 is a front view of the internal chuck.

The automatic assembling apparatus 1 for a differential gear according to the present invention, with side gears R, pinion gears P and so on are assembled within a differential case, as a differential arrangement or mechanism for use in an automobile for example. As shown in FIG. 1, a case supporting unit 2 is provided for supporting the differential case C. A pair of side gear clamp units 3, 3 at an upper side and a lower side is provided for positioning the side gears R, R. A pair of assembling robots 4, 4 are positioned at a left-hand side and a right-hand side of the case supporting unit 2.

Robot hands of the assembling robots 4, 4 are structured so that they can set the pinion gears P and so on at assembling positions therefor, formed as chuck units 4a, 4a. Further, a shaft insertion unit 5, detail of which will be given later, is provided in a direction crossing at a right angle (orthogonal) to an opposing direction of the assembling robots 4, 4.

The differential case C mentioned above, as shown in FIG. 2(A) and 2(B), is closed at a top surface and a bottom surface thereof, and is formed with two openings around side surfaces thereof in a predetermined axial direction.

Namely, imagining three orthogonal axes, i.e., a Y-axis lying in a vertical direction, and X and Z axes lying in horizontal directions, superimposed upon a central portion of the differential case C, the two openings H and H are provided in the direction of the Z-axis. Further, a pair of driving shaft connecting holes d. d are formed in the direction of the Y-axis, and a pair of shaft holes e, e are formed in the direction of the X-axis.

Then, a pair of side gears R and R are inserted within the differential case C, and after putting them together at the central axes thereof along with the direction of the Y-axis (vertical direction) and positioning them at positions opposing to each other, a pair of pinion gears P, P are meshed with the side gears R, R in the openings H. H. By moving the central axes of them so as to fit them to the direction of the X-axis, a shaft S is inserted in the X-axis direction through the shaft holes e, e, thereby fixing the pinion gears P, P.

Further, spherical washers Q. Q are inserted into each contacting portion between the pinion gear P and the differential case C, and the spherical washers Q, Q are therefore also fixed by the shaft S at the same time that the pinion gears P, P are assembled.

The case supporting unit 2 mentioned above, as shown in FIG. 3, comprises a receiving platform 7 extending from a central portion of a hanging stage 6, and it is thereby possible to put the differential case C on the receiving platform 7 and correctly positioning it. At this time, it is so arranged that the direction of the Y-axis of the differential case C is displaced into the vertical direction, and that the Z-axis, in the direction of which are formed the openings H, H of the differential case C, is displaced into a direction coincident with that of the assembling robots 4, 4, provided at the right-hand side and at the left-hand side, as shown in FIG. 1.

The side-gear clamp units 3, 3 mentioned above, as shown in FIGS. 3 and 4, are fixed on an upper stage 8 and a lower stage 9 of the hanging stage 6, respectively, and each of them comprises a cylinder portion 10 which can be inserted into the driving shaft connecting holes d of the differential case C, comprising a core portion 11 which can move within the cylinder portion 10 reciprocally, and a collet chuck 12 at a tip of the cylinder portion, which expands (open) and shrinks (close) due to the reciprocal movement of the core portion 11. When the core portion 11 moves backward, the collet chuck 12 is closed so as to hold the side gear R, and further by adjusting the amount of the moving-back of the core portion 11, it is possible to hold the side gear R rotatable or non rotatable therewith.

Furthermore, when the differential case C is positioned on the receiving platform 7 and the side gears R, R are set by aligning the central axes thereof in the direction of the Y-axis, the cylinder portion 10 of each of the upper and lower side-gear clamp units 3, 3 is inserted into the differential case C through the driving shaft connecting holes d, d. After it is inserted into a central bore of each of the side gears R, the core portions 11, 11 are moved backward so as to clamp the side gears R, R at the internal surface thereof.

The chuck unit 4a of the assembling robot 4 mentioned above, as shown in FIGS. 6 and 7, comprises an arm 13 extending from a tip of the robot hand, and an internal chuck portion 14 which is provided and attached at one tip of the arm 13, which is bent in the shape of an "L".

This internal chuck portion 14 is so arranged that it holds both the pinion gear P and the spherical washer Q (see FIG. 5), mentioned above, as a unit, by inserting it into the shaft insertion bores at each center thereof. At this time, it can be inserted into the shaft insertion hole from an inside of the pinion gear P (i.e., from the center side of the differential case).

Therefore, the internal chuck portion 14 comprises: a cylinder portion 15 which has a small diameter at the tip portion and a large diameter at the base portion thereof; a piston rod portion 16 which moves forward directly outside through the agency of liquid pressure inside of the cylinder portion 15; a spring member 17 which gives force to the piston rod portion 16 biasing it to the backward direction thereof; three (3) shaking blocks 18, each of which is pivotally fixed at the tip of the cylinder portion 15 and can freely shake or vibrate in the radial direction at the tip portion thereof; and an internal surface supporting seal 20 which is wound surrounding the periphery of the shaking blocks 18. When the cylinder 15 is inserted into the shaft insertion bore of the pinion gear P at the small diameter portion thereof and also the piston rod portion 16 is moved forward under the liquid pressure, the shaking blocks 18 are pushed outward in the radial direction so as to be extended and opened, thereby holding the spherical washer Q at the tip portion thereof by its internal surface, and at the same time, holding the pinion gear P at its internal surface by means of the internal surface supporting seal 20.

In addition, when the liquid pressure is released or removed, the piston rod portion 16 moves backward by means of the spring member 17, and the shaking blocks 18 shrink or close so as to release the shaft insertion bores from being held.

Further, an inclining angle of the internal chuck portion 14 with respect to the arm 13 is adjusted to be such that after meshing the pinion gear P with the side gear R by moving the arm 13 up to one side of the opening H of the differential case C, and when the arm 13 is vibrated toward the other side of the opening H, the center of the shaft of the pinion gear and so on can be aligned in the direction of the X-axis.

An angle a between the arm 13 and the Z-axis, when meshing the pinion gear P with the side gear R, is set at about 35 degrees, in accordance with the present embodiment.

In addition, at the base portion of the arm 13, there is provided a shaking mechanism 21.

This shaking mechanism 21 is constructed by connecting the arm 13 and an arm supporting portion 22 through a plurality of springs 23, by which the internal chuck portion 14 becomes able to shake or vibrate at the tip of the arm 13.

The shaft insertion unit 5 mentioned above, as shown in FIG. 3, is provided along the X-axis of the differential case C, and at an opposite side of the differential case C, there is provided a provisional shaft insertion mechanism 25, other than the shaft guide cylinder 24 in the X-axis direction, which is fixed on the receiving stage 7 or the like, and a shaft insertion mechanism 30 which comprises, though not shown in the figure, a shaft pushing means for pushing the shaft S through the shaft guide cylinder 24.

This provisional shaft insertion mechanism 25 comprises a shaft guiding bore 26 in the X-axis direction, which is provided on the hanging stage 6, and, though not shown in the figure, a provisional shaft pushing means for pushing the provisional shaft 27 through the shaft guiding bore 26.

Next, an explanation will be given about the manner of assembling the differential gear by use of the automatic assembling apparatus 1 mentioned above.

First of all, as shown in FIG. 3, after positioning the differential case C by the case supporting unit 2, the pair of side gears R, R are inserted into the inside of the differential case C and are clamped at positions opposing to each other by means of the side-gear clamp units 3, 3. At this moment, the side gears R, R are fitted to a predetermined phase in advance, and are positioned under the condition of being unrotatable.

Next, as shown in FIG. 5, the pinion gear P and the spherical washer Q are held as a single body or a unit, respectively by the internal chuck unit 14 of each of the pair of chuck units 4a. Namely, after putting the spherical washer Q onto the pinion gear P at the outside thereof (i.e., at the side of the differential case), the tip of the internal chuck 14 is inserted through the shaft insertion bores of the pinion gear P and the spherical washer Q from outside of the pinion gear P (i.e., the center side of the differential case), and then the piston rod portion 16 is moved forward so as to expand and open the shaking blocks 18, thereby holding both at the inner surfaces thereof.

By the way, the phase of the gear teeth of the pinion gear P is also set at a predetermined phase aligned to that of the side gear R, in advance.

When holding the pinion gear P and so on, each pinion gear P and so on are moved toward the openings H, H of the differential case C by means of the respective chuck unit 4a, and as shown in FIG. 5, the arm 13 comes into a condition such that it inclines by a predetermined angle β with respect to the Z-axis, and thereby portions of the gear teeth of the pinion gear P and the side gear R are meshed with each other.

Here, the reason for inclining the arm 13 at the angle of β is that, if the arm 13 is not inclined, the pinion gear P and the differential case C may interfere with each other depending upon the shape of the differential case, etc. Therefore, to avoid this problem, it is necessary that the angle β be set at 10 degrees, according to the present embodiment.

When the portions of gear teeth of the pinion gear P and the side gear R are meshed with each other, then the direction of the arm 13 is made coincident with the direction of the Z-axis.

In this series of meshing processes, since both the pinion gear P and the side gear R are set at predetermined phases in advance, as well as the internal chuck 14 being attached at the tip of the arm 13 with the help of the shaking by the shaking mechanism 21, no unreasonable force is applied to any portions of the gear teeth, thereby avoiding any damage on the gear teeth portions.

However, a plane view of when the gear teeth portions of both are meshed with each other is as shown in FIG. 6, wherein the arm 13 approaches up to the one side edge of the opening H of the differential case C and the angle α with respect to the Z-axis is about 35 degrees.

Next, by loosening the side-gear clamp units 3, 3 slightly, the side gears R, R come to be rotatable. When the side gears R, R have become rotatable, the arms 13, 13 are moved to positions in the vicinity of the other side edges of the openings H, H while the arms 13, 13 of both chuck units 4, 4 are being shaken at the base portions thereof in the horizontal direction in a synchronized manner, and further while the side gears R, R are being rotated. Then, the center of the pinion gears P, P and the spherical washers Q, Q come to be coincident with the direction of the X-axis, as shown in FIG. 7.

Next, while moving the shaft S forward through the shaft guide cylinder 24 (see FIG. 3) of the shaft insertion unit 5, the internal chuck 14 is pulled out by releasing the holding thereby at said one side, thereby inserting the shaft S into the shaft insertion bores of the spherical washer Q and the pinion gear P, at said one side.

Then, the internal chuck 14 which is pulled out is removed outside of the differential case C and returns to its original position.

Next, through the provisional shaft insertion mechanism (see FIG. 3) at the other side, the pinion gear P and the spherical washer Q at the other side are held by the provisional shaft 27.

Namely, by moving the provisional shaft forward from the shaft guide hole 26 (see FIG. 3) and, at the same time, by pulling the internal chuck 14 out at the other side and releasing the holding thereby, the provisional shaft 27 is inserted into the shaft insertion bores of the spherical washer Q and the pinion gear P at the other side.

Also, the internal chuck 14 which is pulled out is removed outside of the differential case C and returns to its original position.

When both of the internal chucks 14, 14 are removed outside the differential case C, the shaft S is further moved forward, while the provisional shaft 27 is moved backward, and thereby the shaft S penetrates through and is inserted into both the pinion gears P, P and the spherical washers Q, Q at both sides, like a spear.

Here, the reason for using the provisional shaft 27 and for conducting the operations sequentially at one side and then at the other side, is that it is impossible to do the operations simultaneously because the internal chucks 14, 14 interfere with each other when they are pulled out at the same time.

In accordance with the assembling procedure mentioned above, it is possible to move and precisely assemble the pinion gears P, P and the spherical washers Q, Q at correct positions thereof, without any damage to the gear teeth portions thereof.

Figure 9:
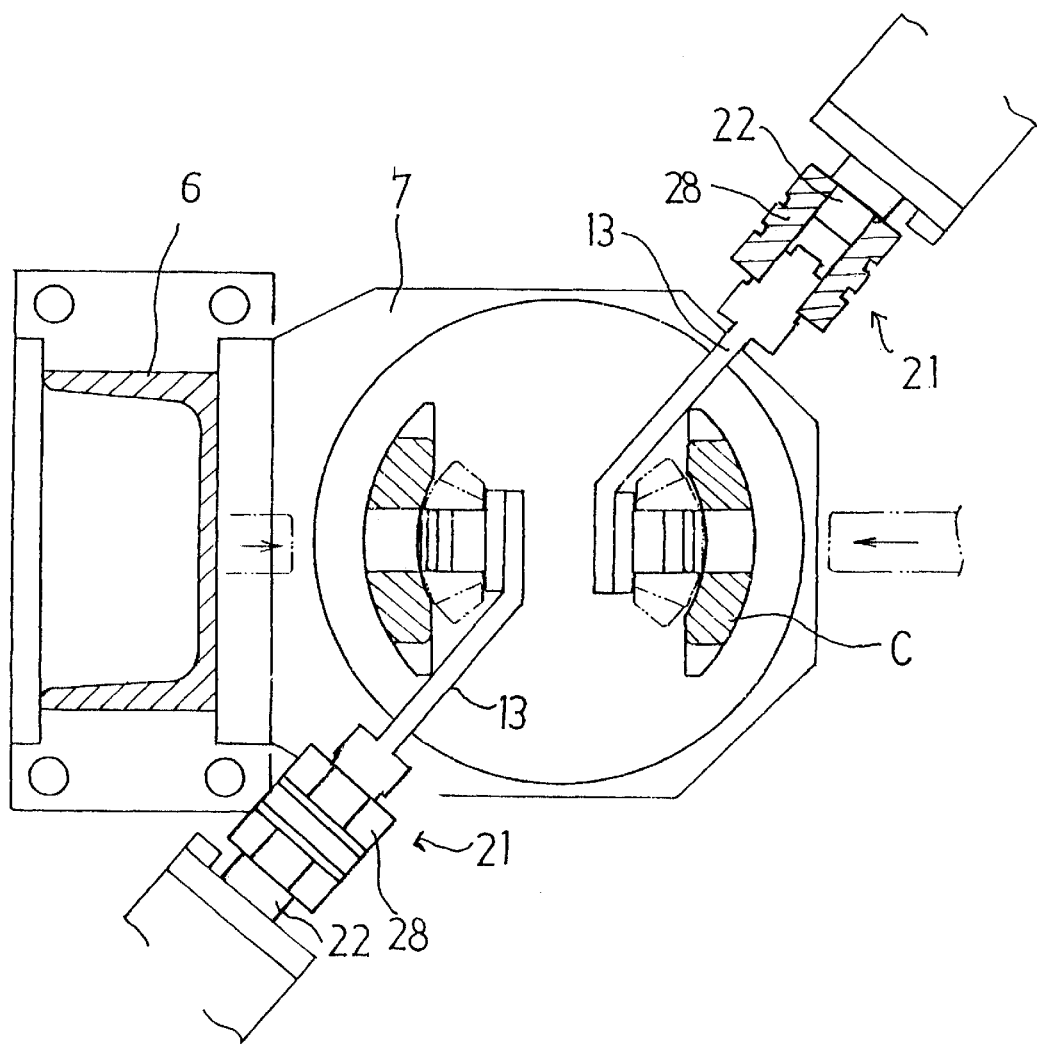
FIG. 9 shows an another embodiment of a shaking mechanism of the assembling apparatus according to the present invention.

By the way, FIG. 9 shows another construction of the shaking mechanism 21.

In this construction, the arm 13 and the arm supporting portion 22 are connected with a coupling 28 having elasticity, thereby making the internal chuck 14 able to shake or vibrate. In this case, the same advantages as mentioned above can be obtained therefrom.

However, the present invention should not be restricted only to those embodiments mentioned above, and therefore, other apparatuses and/or methods which comprise the same or substantially the same elements defined in the claims of the present invention and/or equivalents thereof which show functions and effects which are substantially the same as those of the present invention also fall within the breadth of the appended claims.

For example, in the embodiments shown above, it is explained that the side gear R and the pinion gear P are meshed with each other aligned in phase in advance. However, there can be a case where no such aligning in phase is needed depending on the shapes of the gear teeth portions thereof. Or, when the pinion gear P is moved to the assembling position after meshing the gear teeth portion thereof, an internal chuck with which the pinion gear P is held rotatable can be applied in place of that holding the side gear R rotatable as mentioned above.

As is fully explained above, in accordance with the automatic assembling method and the automatic assembling apparatus of the present inventions. since the pinion gear and the spherical washer are fitted to each other and are inserted with the internal chuck into the shaft insertion bores at the center thereof from inside of the pinion gear, the pinion gear and the spherical washer are thereby held as a unit, and further since they are continued to be held together by the internal chuck, during the period from when the pinion gear is meshed with the side gear until when the pinion gear and so on are moved to the predetermined assembling position, it is therefore possible to set the pinion gear and the spherical washer at a precise assembling position, effectively maintaining the relative position therebetween. Moreover, no pressure is applied to the gear teeth portion when the pinion gears and so on are moved, and there is therefore no fear or possibility of damage occurring to the pinion gears.

Further, after setting the pinion gear and the spherical washer at the predetermined assembling position, by pulling the pair of internal chucks out so as to insert the shaft or the provisional shaft, one by one in sequence, and then inserting the shaft penetrating therethrough when both the internal chucks are removed from the case, it is thereby possible to smoothly and efficiently assemble them without interference between the internal chucks.

Further, since the automatic assembling apparatus comprises the case supporting unit, the side-gear clamp unit, the pair of chuck units, and the shaft insertion unit, wherein the arm and the internal chuck are further provided in the chuck unit and then the internal chuck is attached bent in the shape of a "L" with respect to the arm, it is therefore possible to move the internal chuck up to the assembling positions of the pinion gear and the spherical washer, from the inside of the pinion gear, while holding them with it.

Furthermore, by enabling the side-gear clamp unit to hold the side gear in either condition of being rotatable or unrotatable, the operations of meshing it with the pinion gear and of moving the pinion gear to the assembling position thereof can be performed smoothly.

Further, with the internal chuck which is supported with shaking or vibrations on the base side of the arm through the shaking mechanism, no unreasonable force will be applied to the gear teeth portions of, for example, the pinion gears and the side gears when they are meshed with each other, thereby protecting the gear teeth portions from damage. It is preferable for this shaking mechanism to be constructed with, the arm and the arm supporting portion which are connected with a plurality of the springs, or it may additionally be constructed comprising, the coupling having elasticity.

Further, with the provision of the provisional shaft insertion mechanism for inserting the provisional shaft into the shaft insertion bores of the pinion gear and the spherical washer, at either one of both sides, the shaft can be smoothly inserted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic assembling method for a differential gear, comprising steps of:

positioning a pair of side gears opposing to each other, within a differential case along a predetermined one of three orthogonal axial directions with respect to a central portion of the differential case;

inserting a pair of pinion gears and a pair of spherical washers into the differential case from a pair of openings formed in the differential case in another axial direction orthogonal to the predetermined one of the axial directions;

aligning the pair of pinion gears and the pair of spherical washers at respective central axes thereof in a remaining one of said three orthogonal axial directions; and thereafter, inserting a shaft directly to shaft insertion bores formed at central axial portions of the pinion gears and the spherical washers from a shaft hole of said differential case, inserting an internal chuck directly into each shaft insertion bore from an inner side of the pinion gear after aligning the spherical washer outside of said pinion gear, so as to hold the pinion gear and the spherical washer as a unit;

meshing gear teeth of the pinion gear and the side gear with each other in a vicinity of the opening of said differential case; and then, allowing the side gear to rotate and moving the internal chuck into a predetermined direction, thereby positioning the central axes of the pinion gear and the spherical washer into a predetermined axial direction.

2. An automatic assembling method as defined in claim 1, wherein after aligning the central axes of said pinion gear and said spherical washer into the predetermined axial direction, further comprises the following steps:

pulling the internal chuck out at one side and inserting said shaft or a provisional shaft into the shaft insertion bores of the pinion gear and the spherical washer at said one side, thereby fixing them to a differential case;

following the step above, pulling the internal chuck out at another side and inserting at least one of provisional shaft and said shaft into the shaft insertion bores of the pinion gear and the spherical washer at said other side, thereby fixing them to the differential case; and, advancing said shaft towards the shaft insertion bores into which the provisional shaft is inserted at a time when both of the internal chucks are removed from the differential case, so as to insert the shaft in place of the provisional shaft, thereby causing the shaft to penetrate positively into the shaft insertion bores.

3. An automatic assembling apparatus for a differential gear, in which a pair of side gears, a pair of pinion gears and a pair of spherical washers are inserted into a differential case and are assembled by a shaft, comprising:

a case supporting unit for positioning said case at a predetermined position thereof;

a side-gear clamp unit for positioning said pair of side gears at predetermined positions thereof within the case;

a pair of chuck units, each of which can hold said pinion gear and said spherical washer simultaneously and move them to predetermined positions thereof; and a shaft insertion unit for assembling the pinion gears and the spherical washers by inserting the shaft into the shaft insertion bores formed at the central axial portions thereof from a shaft hole of said case, wherein each of said chuck units comprises an internal chuck attached at a tip of an arm, each insertable into the shaft insertion bore of said pinion gear and said spherical washer to hold them at internal surfaces of bores thereof, and further each of said internal chucks is attached to said arm bent at an inclining angle.

4. An automatic assembling apparatus for a differential gear as defined in claim 3, wherein said side-gear clamp unit is able to hold the side gear either rotatably or unrotatably.

5. An automatic assembling apparatus for a differential gear as defined in claim 4, wherein the internal chuck of the chuck unit shakes through a shaking mechanism provided at a base portion of said arm.

6. An automatic assembling apparatus for a differential gear as defined in claim 5, wherein said shaking mechanism is constructed with said arm and an arm supporting portion f or supporting said arm, being connected with a plurality of springs.

7. An automatic assembling apparatus for a differential gear as defined in claim 5, wherein said shaking mechanism is constructed with said arm and an arm supporting portion f or supporting said arm, being connected with a coupling having elasticity.

8. An automatic assembling apparatus for a differential gear as defined in claim 3, wherein said shaft insertion unit further comprises a provisional shaft insertion mechanism for temporarily positioning the pinion gear and the spherical washer at either one side by inserting a provisional shaft into the shaft insertion bores thereof.

* * * * *